(12) United States Patent
Cipolla et al.

(10) Patent No.: US 6,181,553 B1
(45) Date of Patent: Jan. 30, 2001

(54) ARRANGEMENT AND METHOD FOR TRANSFERRING HEAT FROM A PORTABLE PERSONAL COMPUTER

(75) Inventors: Thomas Mario Cipolla, Katonah; Lawrence Shungwei Mok, Brewster, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 09/148,690

(22) Filed: Sep. 4, 1998

(51) Int. Cl.[7] .............................. H05K 5/00; H05K 7/20; H01B 9/06; F28F 7/00; F28D 15/00
(52) U.S. Cl. .................... 361/687; 361/688; 361/689; 361/698; 361/686; 361/700; 174/15.1; 174/15.2; 165/80.4; 165/104.33
(58) Field of Search .................... 361/689, 698, 361/697, 686, 687, 688, 700; 174/15.2, 15.1; 165/80.4, 104, 33

(56) References Cited

U.S. PATENT DOCUMENTS

| | | |
|---|---|---|
| 5,550,710 | 8/1996 | Rahamim et al. |
| 5,694,292 | 12/1997 | Paulsel et al. |
| 5,704,212 | 1/1998 | Erler et al. |
| 5,959,836 * | 9/1999 | Bhatia .................... 361/687 |
| 5,974,556 * | 10/1999 | Jackson et al. .................... 713/322 |

OTHER PUBLICATIONS

Albert Yu, "The Future of Miccoprocessors", *IEEE Micro*, Dec. 1996, pp. 46–53.

* cited by examiner

*Primary Examiner*—Leo P. Picard
*Assistant Examiner*—Tung Minh Bui
(74) *Attorney, Agent, or Firm*—Scully, Scott, Murphy & Presser; Daniel P. Morris, Esq.

(57) ABSTRACT

An arrangement and method for enhancing the cooling capacity of portable personal computers. More particularly, there is provided to the provision of an arrangement for increasing the cooling capacity of portable personal computers, particularly such as laptop or notebook computers. The computer possesses a keyboard having the rear edge thereof hingedly connected with the bottom of an openable display unit or panel, and containing heat-generating computer electronics, from which heat is removed through a heat pipe terminating in a coupling arrangement possessing elements which connect to and disconnect from each other when, respectively, docking and undocking the portable personal computer in a docking station so as to facilitate the transference of heat from the portable personal computer through the coupling arrangement into the docking station from whence the heat is dissipated to the surroundings through the intermediary of a heat sink.

24 Claims, 7 Drawing Sheets

ARRANGEMENT AND METHOD FOR TRANSFERRING HEAT FROM A PORTABLE PERSONAL COMPUTER

BACKGROUND OF THE INVENTION

The present invention relates to an arrangement for enhancing the cooling capacity of portable personal computers. More particularly, the invention is directed to the provision of an arrangement for increasing the cooling capacity of portable personal computers, particularly such as laptop or notebook computers. The computer possesses a keyboard having the rear edge thereof hingedly connected with the bottom of an openable display unit or panel, and containing heat-generating computer electronics, from which heat is removed through a heat pipe terminating in a coupling arrangement possessing elements which connect to and disconnect from each other when, respectively, docking and undocking the portable personal computer in a docking station so as to facilitate the transference of heat from the portable personal computer through the coupling arrangement into the docking station from whence the heat is dissipated to the surroundings through the intermediary of a heat sink.

Commencing from the time of conception and design development of computers, and especially portable personal computers; for instance such as laptop computers or the like, there has been encountered the aspect of thermal management as a result of heat which is generated by the processor and other electronic components of the computer. As is widely known in the computer technology, excessive amounts of heat can readily degrade the performance of computers, and additionally may cause the components of the computers to be damaged. Consequently, thermal management is frequently considered to be an extremely important aspect in the design and development of computers.

The capacity and performance of portable personal computers, such as laptop computers, notebook computers or the like, has recently been enhanced to such an extent that; for example, since the beginning of 1996, the thermal dissipation requirements of portable personal computers (PCS) have increased from about 10 watts to 25 watts and even higher values. This increase in the thermal dissipation requirements is a result of ever increasing CPU performance and additional functionality; such as DVD, modem, audio and the like, which are provided by future PCS. As elucidated in an article by Albert Yu, "The Future of Microprocessors", IEEE Micro, December 1996, pages 46 through 53, the trend of increasing power dissipation in the form of heat for portable personal computers will continue in the foreseeable future. Thus, at the widely employed A4 form factor for a portable personal computer; in essence, a 297 by 210 mm footprint, for instance, the cooling limit for a portable PC without an active cooling device, such as a cooling fan or providing additional passive cooling capacity is currently approximately 15 to 20 watts.

Although cooling capacity can be added through the installation of an active cooling device, such as a fan, this is normally not desirable inasmuch as these devices take up space, consume power and generate noise. Particularly in a portable personal computer, space and battery consumption and service life are at a premium, and the generating of noise is deemed to be highly undesirable. As a result, active cooling devices have been employed as a last resort in attempts to obtain additional cooling capacity. In contrast therewith, passive cooling methods and arrangements are considered to be most desirable and efficient since they do not consume any power, generate no noise and quite often take up no additional space. Thus, providing a greater cooling capacity than the current limits in order to meet the anticipated thermal dissipation requirements of future portable personal computers, represents not only a potential competitive advantage in industry, but also provides a significant product differentiation from currently available and commercially sold portable personal computers.

In particular with regard to the power consumption of laptop computers, there has been recently a continued increase in the power of the CPU. For example, the total of power of a laptop computer is normally about 10 watts, and has now increased to a range of about 30 to 40 watts or higher, whereas the CPU power has been increased from about 2 to 6 watts and, conceivably, can be as high as in the 10 watt range. Most of this power will eventually be dissipated in the form of heat to the surroundings. Consequently, being able to remove increased amounts of heat from the laptop computer becomes a critical factor in the construction and operation of such laptop computers.

One approach to solving the heat load problem is to run the processor chip, which is usually the greatest heat generator, at two different clock speeds, a slow speed which generates less heat, when the portable personal computer is used in a mobile environment, and a faster, hotter state when used in an immobile environment, such as when used in a docking station, where power and space is abundantly available. This allows the user to use the full speed of the processor while at a docking station where the full power of the computer is most often needed and at the same time the user can use the computer in a mobile state, i.e. powered by battery only and without a docking station, with the processor running at a reduced rate to minimize heat generation. In order for this approach to work, means for dissipating additional heat is needed when the computer is installed in a docking station.

DISCUSSION OF THE PRIOR ART various arrangements and devices for increasing the cooling capacities of laptop computers are currently known in the technology.

Erler, et al., U.S. Pat. No. 5,704,212 discloses a heat sink in a docking station which comes into contact with the bottom of a computer when the latter is docked. A fan in the docking station then dissipates the heat from the heat sink into the ambient air. One problem with this approach is that the heat generated by the heat producing elements in the computer must be transmitted to the bottom contact area, either by restricting the placement of these heat producing elements to a bottom contact area or by transferring the heat by means of a conductive element or a heat pipe. Another problem with this approach resides in that the amount of heat removed through the bottom contact area is highly dependent upon the material which is used for the contact area. In most instances, material employed in presently produced portable personal computers is ABS plastic, which is a relatively poor choice of material for transmitting heat. When using a better conductor, such as aluminum, the amount of heat to which this area is subjected, even when the computer is operated at a lower power in a mobile mode, is enough to produce a hot spot which is uncomfortable for the user to touch when the computer is operated while resting on the lap of the user.

Paulsel, et al., U.S. Pat. No. 5,694,292 discloses a similar approach where a computer rests on spacers while docked in the docking station. This arrangement forms an air channel between a support shelf and the bottom of the computer. Air is then drawn through the air channel by means of a fan in the docking station thus cooling the bottom surface of the computer. However, this concept is subject to precisely the same disadvantages as the approach employed in Erler, et al.

Rahamim, et al., U.S. Pat. No. 5,550,710 discloses a device similar to a portable personal computer, called a personal processor module. In this publication, liquid heat sinks convey heat to an outer case of aluminum where either a fan or a heat pipe carries heat away from the surface of the case. While this represents an appropriate method of dissipating heat for a personal processor module since the latter does not come into contact with the user while in use, it would not be satisfactory for a portable personal computer since the user would be subject to touching an uncomfortably hot surface.

SUMMARY OF THE INVENTION

Accordingly, in order to clearly and unambiguously provide advantages over the current state-of-the-technology, the present invention discloses an automatic coupling arrangement or device between a heat pipe which is located within the portable personal computer and a heat dissipating arrangement located within a docking station. The heat pipe connection extending between the heat generating device in the computer, such as the electronics or a processor chip, and a coupling element representing one-half of a coupling device which resides between the computer is attachable to a second half of the coupling device which is a coupling element of the docking station, and wherein a heat dissipating arrangement communicating with the coupling device, such as a heat sink and a fan, is located within the docking station for transfer ring heat thereto from the computer.

Accordingly, it is an object of the present invention to provide an arrangement for effectuating the automatic coupling between a heat pipe of a portable personal computer and a heat dissipating arrangement including a heat sink located in a docking station in which the computer is adapted to be docked, and which facilitates the transfer of heat from the computer to the heat sink located in the docking station.

Another object of the present invention is to provide a method of coupling a heat pipe in a portable personal computer and which leads from a source of heat generation in the computer to a first coupling element, and wherein a second coupling element which is a component of a docking station, upon being coupled with the first coupling element when the computer is docked in the docking station, is adapted to have heat transferred thereto from the heat pipe and transferred to a heat sink in the docking station so as to dissipate the heat received from the computer.

BRIEF DESCRIPTION OF THE DRAWINGS

Reference may now be had to the following detailed description of preferred embodiments of the invention, taken in conjunction with the accompanying drawings; in which.

DETAILED DESCRIPTION OF PREFERRED EMBODIMENTS

Basically, heat pipes operate on the principle that a liquid will boil when heated in a sealed container having a volume of the liquid contained therein, where the gaseous or vaporized liquid flows to the colder end of the sealed container and condenses, thus transporting heat energy from the hot end to the cold end of the container. The condensate then returns to the hot end of the container either by gravity or by gravity assisted by a wick contained in the volume. These devices are well known in the art and can be obtained by purchasing them from; for example, Thermacore Corporation, Lancaster, Pa., or Fujikura, Ltd., Tokyo, Japan. These devices are capable of transferring heat at a rate that is equivalent to 100 to 200 times that of the conductivity of copper.

Figure 1:
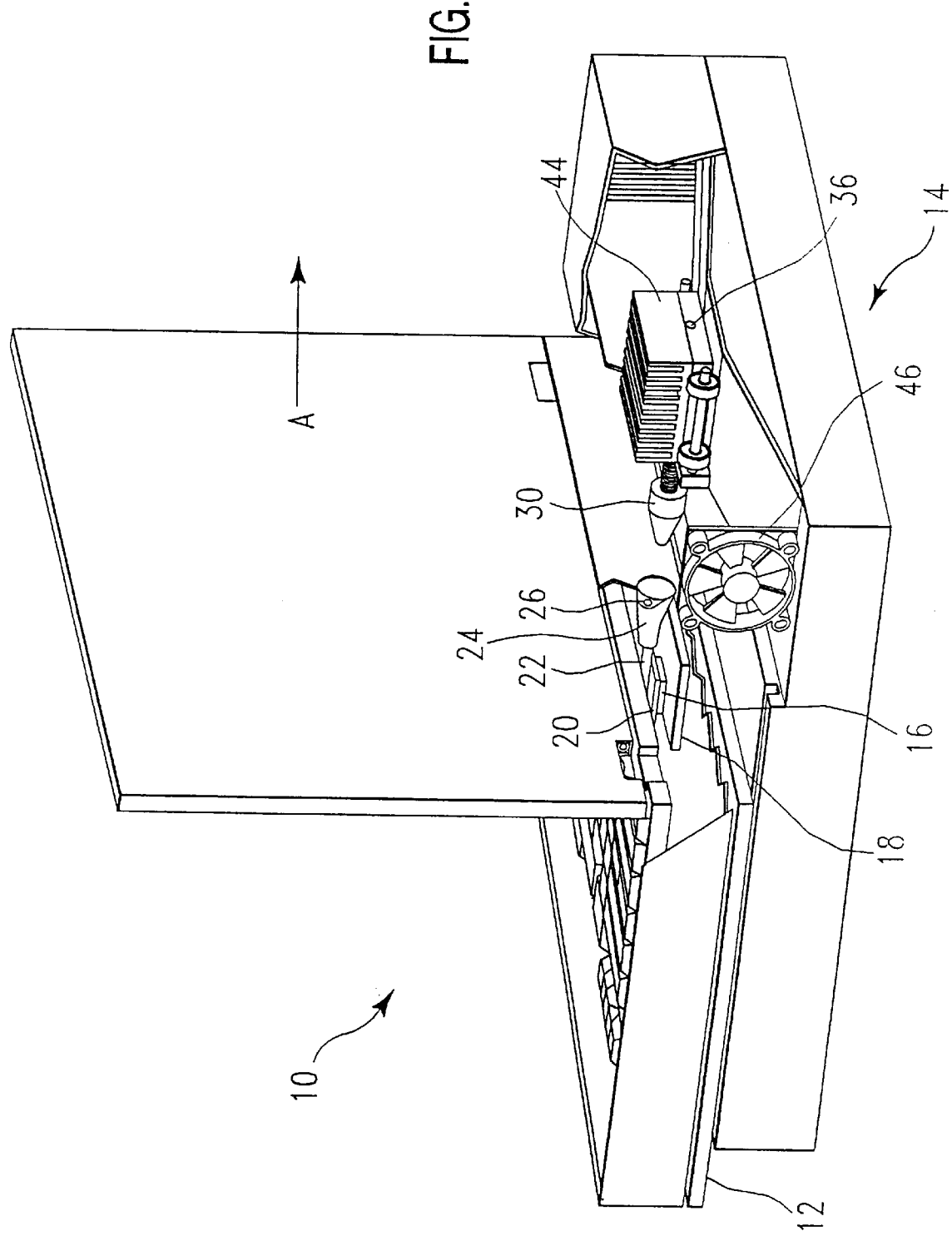
FIG. 1 illustrates, generally diagrammatically, a perspective rear and side view of a portable personal computer which is in the process of being docked in a docking station.

Referring to FIG. 1, which represents a perspective, partly broken away view of a portable personal computer 10 resting on but not yet docked a docking station shelf 12 of a docking station 14, the computer contains a heat generating device 16 such as a processor chip mounted on a printed circuit board 18. Attached on top of the heat generating device 16 is a heat spreader 20, this attachment being made such that heat generated by the heat generating device 16 will readily conduct heat to heat spreader 20. This is a process which is well known in the technology. In a similar manner, heat pipe 22 is thermally attached to the heat spreader 20.

The cold end of the heat pipe 22 is thermally attached to a receiving socket 24 of a coupling device. Socket 24 is made of a material possessing a good thermal conductivity, such as copper or aluminum.

When portable personal computer 10 is pushed forwardly in the direction of arrow A so as to be docked in the docking station 14, plug 30 is automatically inserted into the socket 24. The plug 30 has one end of a second heat pipe 36 thermally attached thereto, whereas the opposite end of heat pipe 36 is thermally attached to a heat sink 44 in the docking station 14. Heat from heat sink 44 is then dissipated into the ambient air by natural convection or by means of a fan 46.

Figure 2:
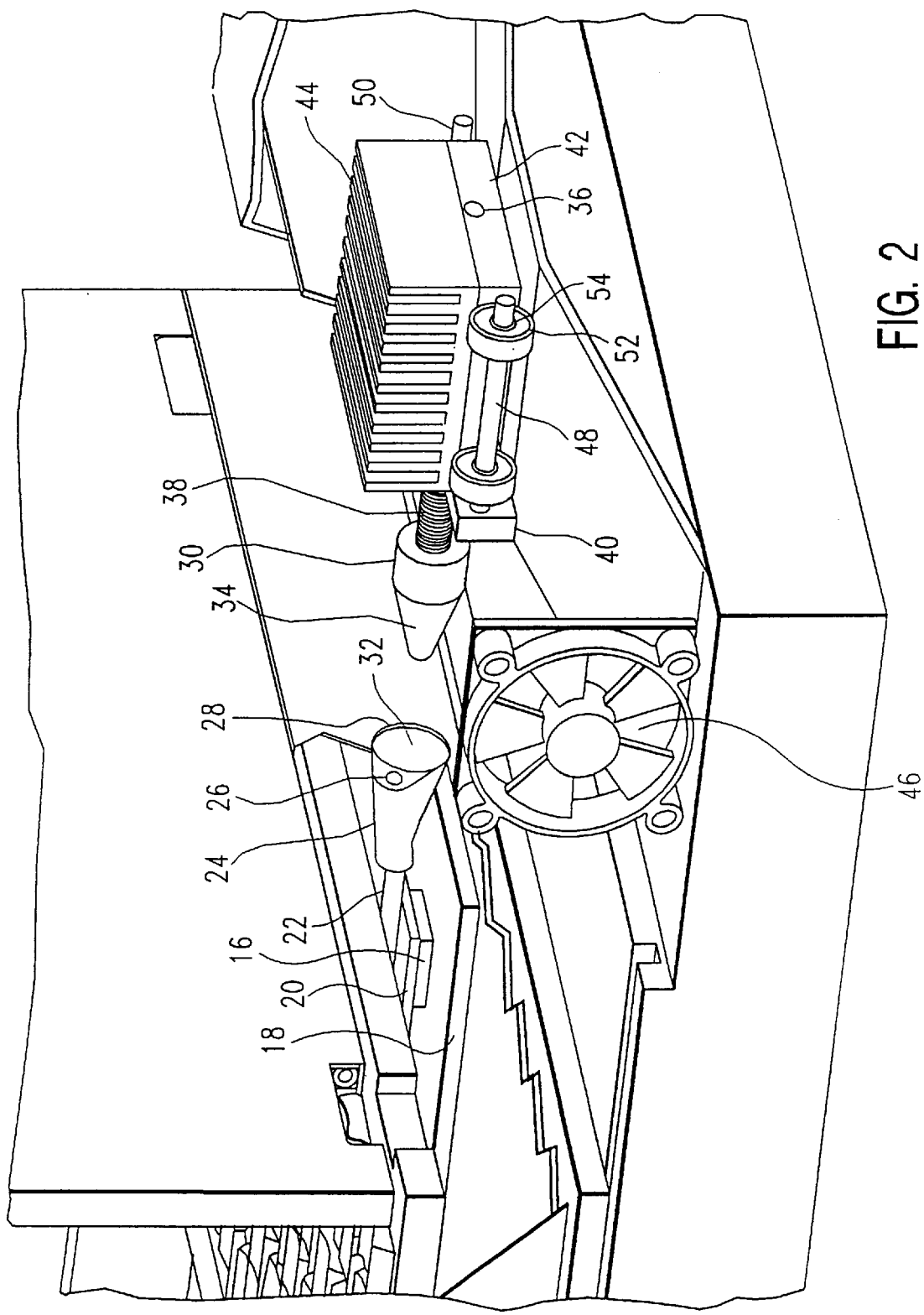
FIG. 2 illustrates, on an enlarged scale, a portion of the personal computer and docking station of FIG. 1, showing the coupling arrangement for the transfer of heat from the computer to the docking station in an uncoupled position.

Referring to FIG. 2, at the end of the motion causing the docking of the computer 10, after the plug 30 has been inserted into socket 24, a spring 38 is compressed so as to exert an axial force against the plug 30. A reaction force from the spring 38 is taken up by a stationary bracket 40. The motion of compressing of the spring 38 is taken up by permitting platform 42 carrying the heat sink 44 to slide along rods 48 and 50 which are attached to the stationary bracket 40. However, numerous other ways are possible to take up the motion of the heat sink 44; for example, if the heat sink 44 is sufficiently small, which would be likely if the amount of heat which is to be removed is small, then the heat sink 44 can simply cantilever off the heat pipe 36, thereby eliminating the need for rods 48 and 50.

An important consideration in transferring heat from heat pipe 22 to socket 24 is to provide for a large area of contact with a good thermal connection therebetween. For example, a 3 mm diameter copper heat pipe inserted into a hole in a copper block which is 25 mm deep, has a clearance of 25 to 50 micrometers, and when the two pieces are soldered together, this provides enough thermal conductivity at the interface such that approximately eight watts of power can be transferred to the block for a temperature difference of six degrees C. If a greater power dissipation is necessary, larger diameter heat pipes and proportionally greater areas of contact can be employed.

Figure 3:
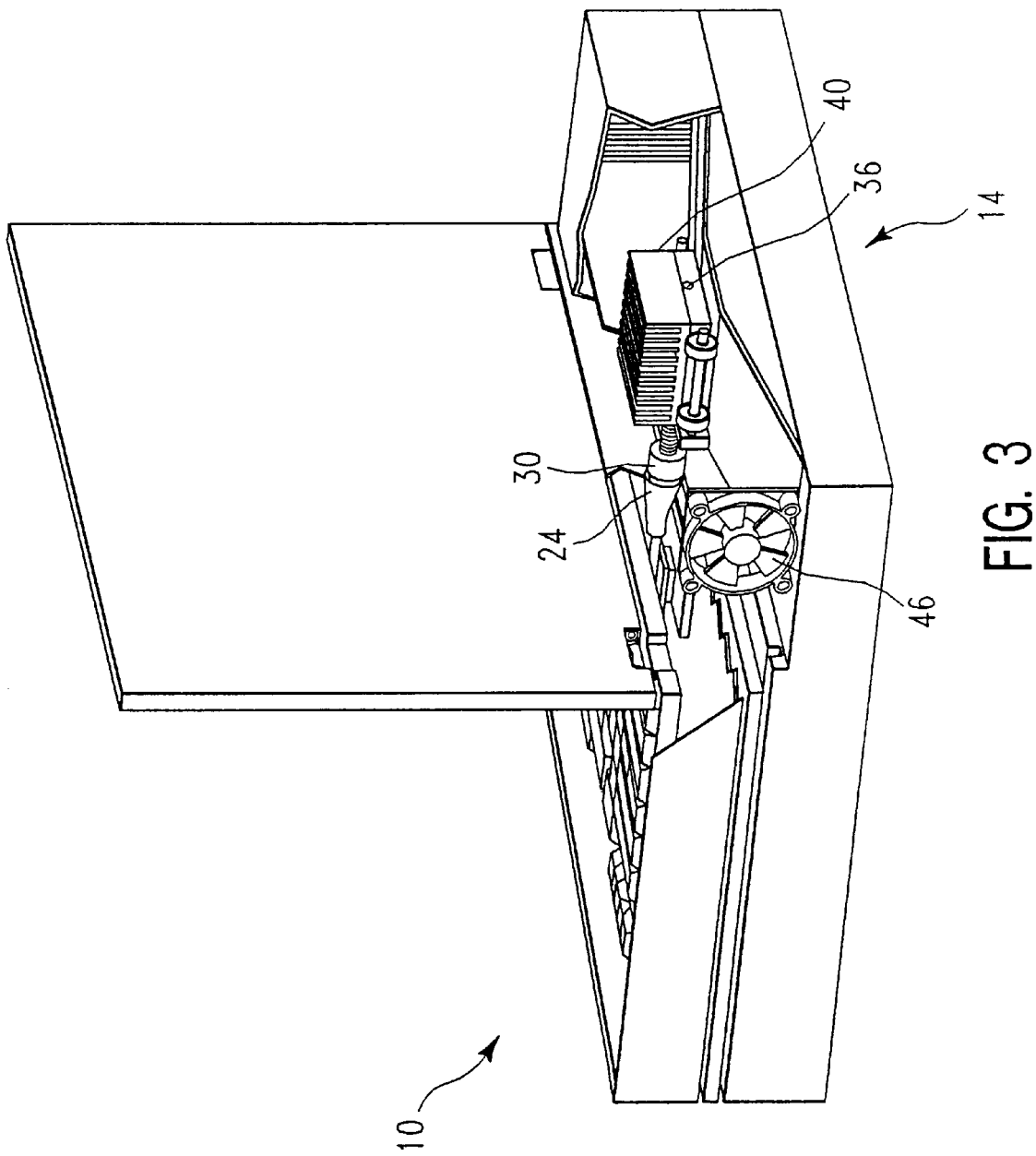
FIG. 3 illustrates, in a manner similar to FIG. 1, the portable personal computer in a docked position on a docking station, with portions being broken away to show the interconnected coupling arrangement for the transfer of heat from the computer to the docking station.

The heat pipe 22 is inserted into a hole 26 in socket 24 and soldered in place. Another hole 28 in the socket 24 has a conical shape to accept a similarly shaped plug 30 when the portable personal computer 10 is pushed forwardly to dock it in the docking station 14. In this position, as shown in FIG. 3, heat is transferred from the socket 24 to the plug 30 across the interface of surface 32, as shown in FIG. 2, on socket 24 and surface 34 on the plug 30. Plug 30 has a central hole 30a through which a second heat pipe 36 is inserted and then soldered thereto, whereas the opposite end of heat pipe 36 is thermally attached to the heat sink 40.

The axial force acting on the plug 30 causes a normal force to be exerted against socket surface 32 the by plug surface 34 which is equal to the axial force divided by the sine of the cone angle (axis to surface) of plug 30. A small or acute cone angle (with the sine of the angle approaching zero) will cause the formation of an extremely large normal force. However, it is well known that friction and the elasticity of the material causes small or acutely angled conical plugs to lock into mating conical holes. A standard "self-releasing" taper, in effect, one that does not lock, is one which subtends an angle of 3.5 inches per linear foot, or about sixteen degrees. This is close to an optimum angle for generating a large surfaced normal force but which still does not lock the socket and plug together. The angle could be made smaller or narrower by the application of friction-reducing coatings.

In order to provide for a good contact between the surfaces 32 and 34, there must be some angular compliance between the plug 30 and socket 24. One method of achieving this is if heat pipe 36 is of a smaller diameter (3 or 4 mm), it will flex enough to allow the plug 30 to seat into socket 24. Alternatively, if heat pipe 36 does not allow for an adequate compliance, soft compliant bushings 52 may be used between hard bushings 54 and the platform 42. Another means of accommodating compliance which is shown in a further embodiment hereinbelow, is to insert a compliant member, such as a sponge rubber element between the heat sink 44 and the platform 42. Additionally, as stated above, if heat sink 44 can be cantilevered off heat pipe 36, then the heat sink 44 would be free to move so as to be able to accommodate small angular errors.

In order to attain an almost negligible thermal resistance between the surfaces 32 and 34 when these are engaged, the area of contact is needed to be about twice that of the soldered joint between the heat pipe 22 and the socket 24. For example, a 3 mm diameter heat pipe soldered into a hole which is 20 mm deep has a contact area of 251 mm$^2$. A conical frustum which has a minor diameter of 4 mm, a cone angle of 16 degrees and a height of 17 mm has a lateral area of 498 mm$^2$.

Figure 4:
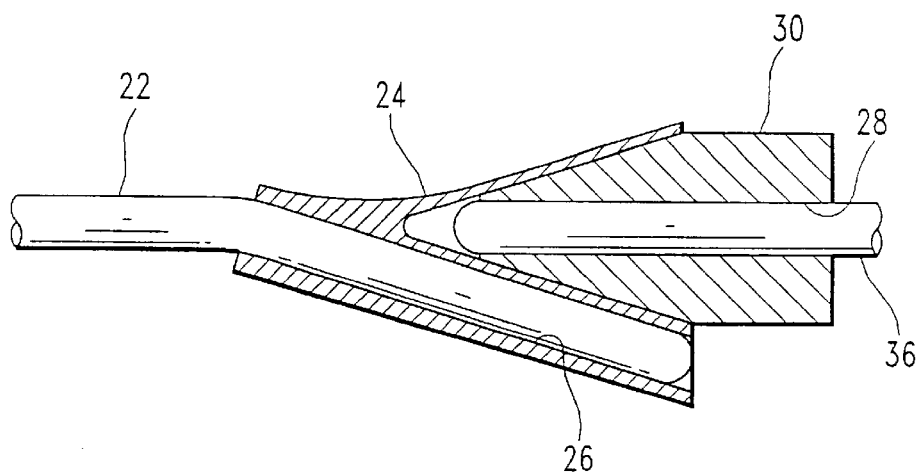
FIG. 4 illustrates an enlarged axial cross-sectional view of the coupling arrangement as utilized in FIG. 3.

Inasmuch as an important consideration in designing a portable personal computer is to make the construction thereof as light as possible, the socket 24 is produced from as little material as possible. The socket consists of a conical cavity 28, with the hole 26 arranged optimally with its axis extending parallel to the lateral face of conical cavity 28, and with approximately one-millimeter thick material surrounding these two cavities, a detail of the socket 24 and plug 30 being shown in FIG. 4, the latter being a sectional view taken along a plane extending through the respective centerlines of cavities 26 and 28.

Figure 5:
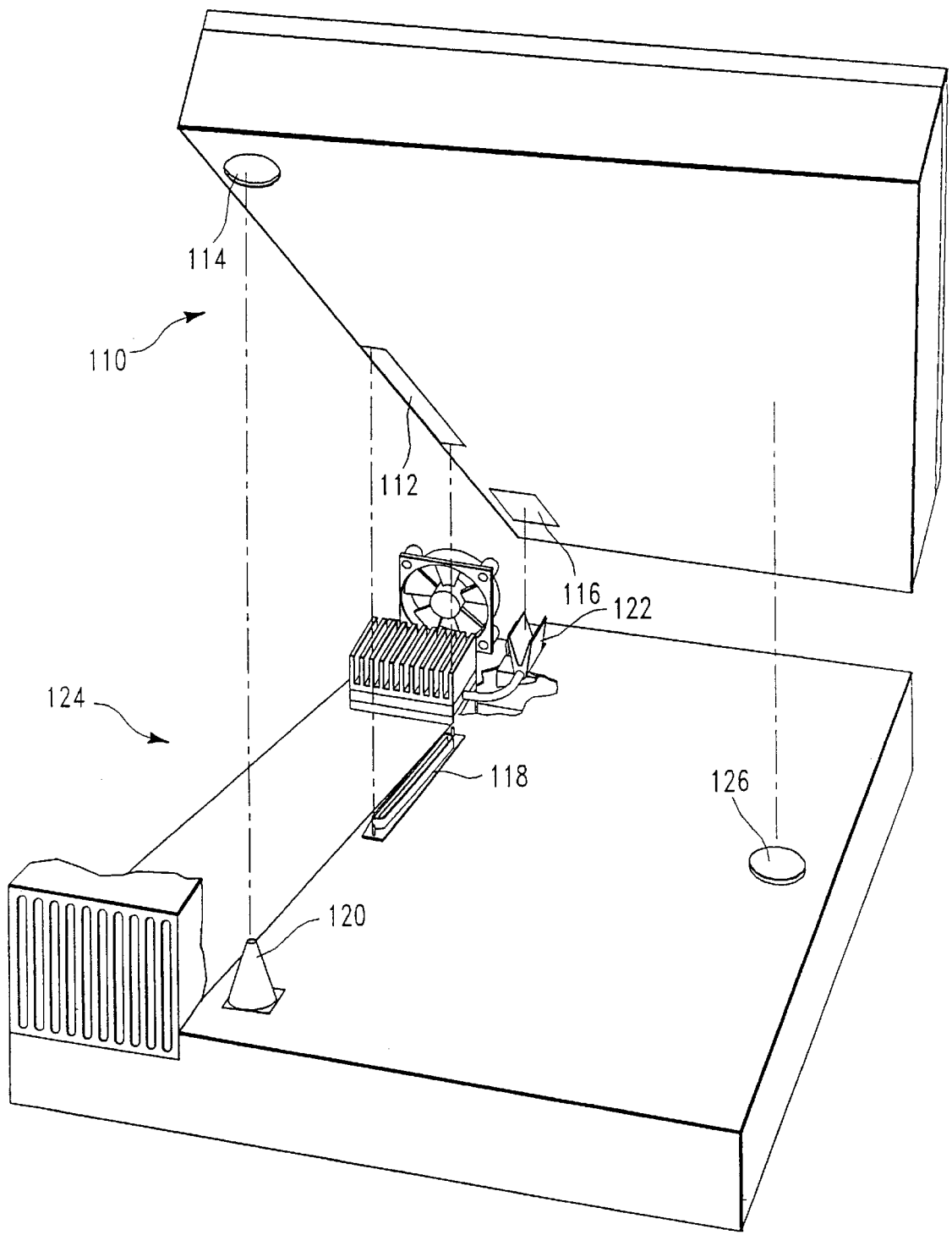
FIG. 5 illustrates, generally diagrammatically, an exploded perspective view of a second embodiment of a coupling arrangement for the thermal interconnection between a portable personal computer and a docking station.

Another embodiment of the present invention is shown in FIG. 5. In this embodiment, there is employed a docking station 124 without a sliding shelf 12. Instead, a computer 110 is equipped with an electrical plug 112, a thermal plug 114 and a thermal socket 116 on the bottom thereof adapted to mate with, respectively, an electrical socket 118, a thermal plug 120 and a thermal socket 122 located on docking station 124. Since there is no sliding shelf provided adapted to accurately guide computer 110 such that electrical plug 112 aligns with electrical socket 118, the thermal plugs 120 and 114 and sockets 120 and 122 may be used for this purpose. Plug 120 and socket 114 are conically shaped, as in the previous embodiment, whereas the 116 and socket 122 are wedge-shaped. This arrangement allows the conical plug 120 and socket 114 to locate computer 110 in a plane parallel to its bottom surface, and wedge plug 116 and socket 122 to rotationally locate computer 110 with the same plane. A resting pad 126 is located on the docking station 124, which supports computer 110 at one point while engaged with docking station 124. The thermal plug 120 and thermal socket 122 serve as two other resting points. By means of this three-point resting arrangement, the socket 114 and plug 116 are ensured as to their proper seating in, respectively, plug 120 and socket 122.

Figure 6:
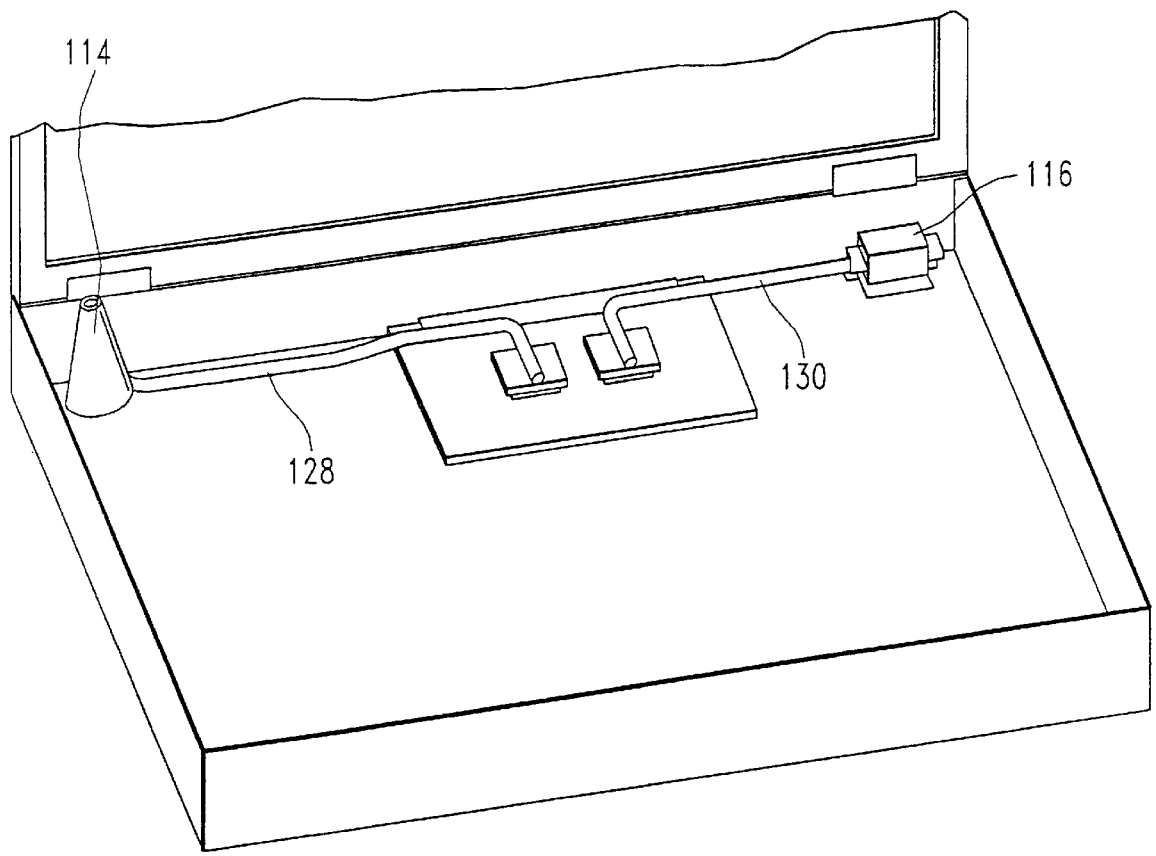
FIG. 6 illustrates, generally diagrammatically, an internal perspective representation of the portable personal computer of FIG. 5, with portions of the internal components having been removed for purposes of clarity.
Figure 7:
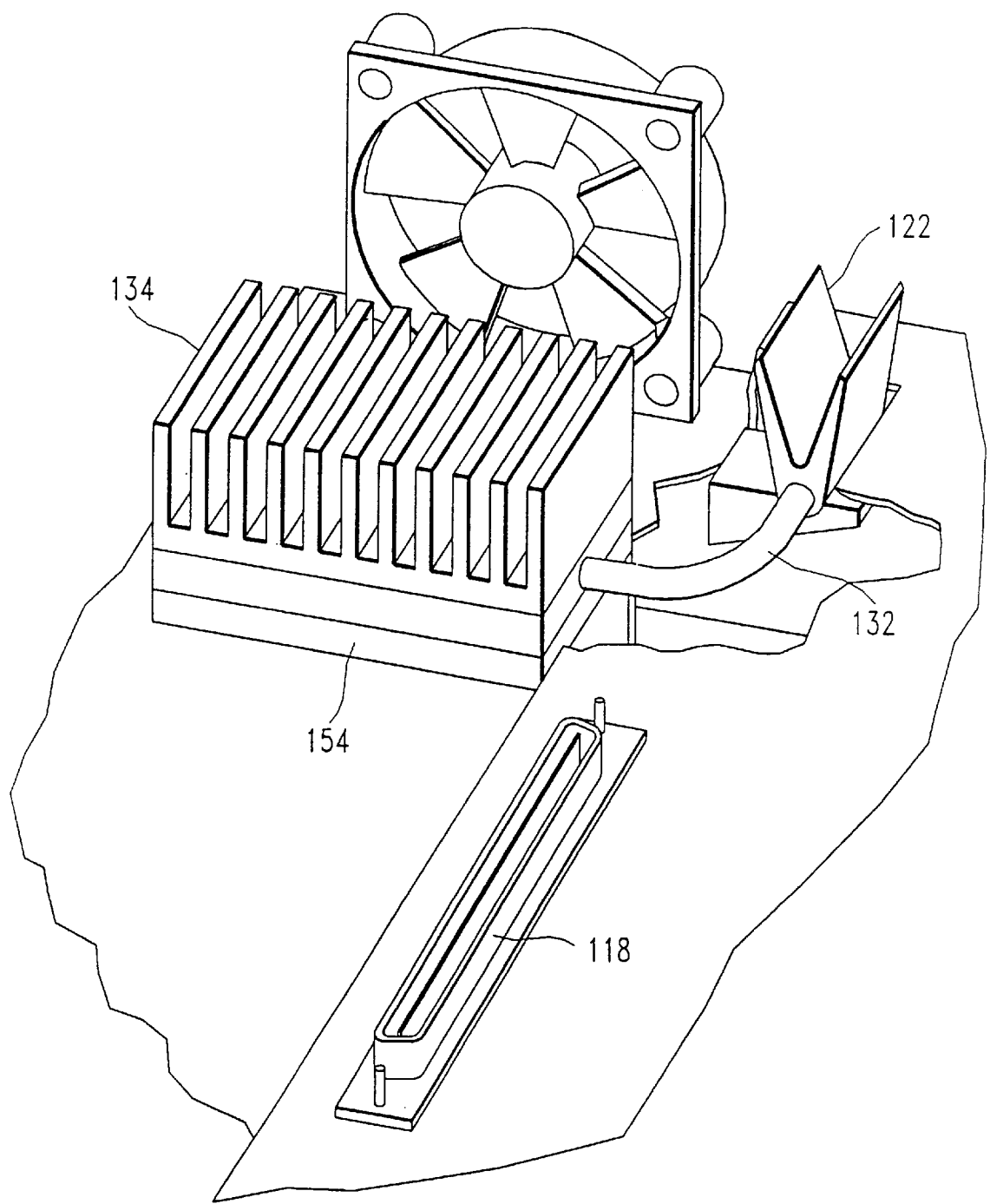
FIG. 7 illustrates, on an enlarged scale, a perspective detail view of one-half of the thermal coupling arrangement which is thermally attached through the intermediary of a heat pipe to a heat dissipating device, as employed in the embodiment of FIG. 5.
Figure 8:
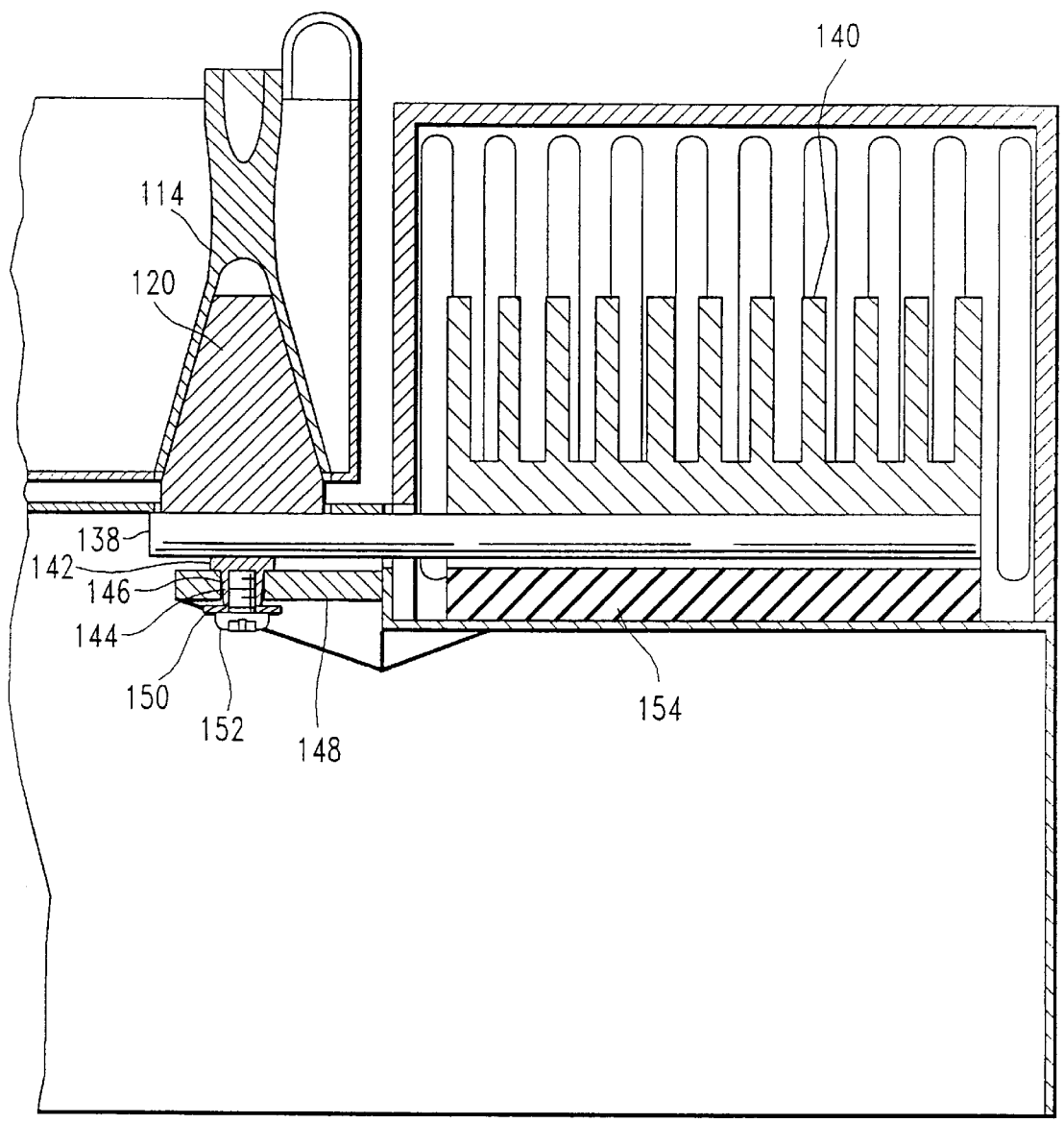
FIG. 8 illustrates, on an enlarged scale, an elevational cross-sectional view of a modified thermal coupling device with one element of the coupling device being thermally attached through the intermediary of a heat pipe to a heat dissipating device in a docking station, and being illustrative of the mounting aspect thereof.

Referring to FIG. 6, socket 114 and plug 116 are thermally attached to heat pipes 128 and 130 in the computer, which in turn are connected to heat generating devices, as in the previous embodiment. Socket 122 is thermally connected to heat pipe 132 which is, in turn, thermally connected to heat sink 134, as shown in FIG. 7. Similarly, plug 120 is connected to heat pipe 138 and heat sink 140, as shown in FIG. 8. It is to be understood that heat pipes 132 and 138 may not be necessary in all applications, and that conductive means for transferring heat may be used instead of heat pipes 132 and 138.

Structure may be required in order to take up small angular misalignments of the plug 120 and socket 122 when these are engaged in, respectively, socket 114 and with plug 116. Referring to FIG. 8, plug 120 is provided with a shoulder 142 and a tapered guide shaft 144. The shaft 144 is inserted into a hole 146 through a stationary bracket 148, and plug 120 rests on shoulder 142. Plug 120 is loosely secured by means of washer 150 and screw 152. When socket 114 engages the plug 120, the plug 120 is then allowed to tilt through a small angle, since the tapered shaft 144 is also permitted to tilt through a small angle within the hole 146. Socket 122 is provided with has a similar mounting arrangement. When small angles are accommodated in this manner, the motion of plug 120 and socket 122 must be taken up in some way, consequently, as stated above, small diameter heat pipes made of flexible material may flex to take up this motion. Another method would be to mount heat sinks 134 and 140 on a flexible resilient pad 154, such as made of sponge rubber, as shown in FIGS. 7 and 8.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

Having thus described our invention, what we claim as new, and desire to secure by Letters Patent is:

1. An arrangement for enhancing the cooling capacity of a portable personal computer through the transfer of heat therefrom to a docking station having said computer docked therein; comprising:
   (a) said portable personal computer having at least one heat pipe having a first end thermally connected to heat generating means in said computer and an opposite end terminating in a first coupling element of a coupling device;
   (b) a second coupling element of said coupling device being mounted on said docking station; and heat dissipating means in said docking station being thermally connected to said second coupling element, said second coupling element being engageable with said first coupling element for the transfer of heat therethrough from said at least one heat pipe to said heat dissipating means for dissipating the heat to ambient air; and
   (c) said first coupling element comprising a socket member including a bore for fixedly receiving said opposite end of said at least one heat pipe; and a conical recess being formed in said first coupling element adjacent said bore for receiving said second coupling element.

2. An arrangement as claimed in claim 1, wherein said second coupling element comprises a plug having a frusto-conical portion engageable in said conical recess of said second coupling element upon said computer being docked in said docking station; a bore extending through said frusto-conical portion of said plug; and a second heat pipe having a first end fixed in said bore of the plug and having an opposite end thermally communicating with the heat dissipating means in said docking station.

3. An arrangement as claimed in claim 1, wherein said heat dissipating means in said docking station comprises a mechanical heat sink.

4. An arrangement as claimed in claim 1, wherein said heat dissipating means in said docking station is resiliently mounted so as to compensate for any misalignment between said first and second coupling elements during docking of said computer in said docking station.

5. An arrangement as claimed in claim 2, wherein said conical recess in said first coupling element and said frusto-conical plug portion which is insertable therein are each formed to define an acutely angled taper to prevent locking together of the coupling elements while forming a large heat transfer area therebetween.

6. An arrangement as claimed in claim 2, wherein said heat pipes comprise flexible means to provide compliance in aligning said coupling elements.

7. An arrangement as claimed in claim 2, wherein said computer comprises a bottom housing containing a least one heat-generating electronic component thermally connected with said at least one heat pipe, and a display panel hingedly connected to a rear edge of said housing, said first coupling element extending through a rear wall of said housing in parallel with the bottom of said housing.

8. An arrangement as claimed in claim 2, wherein said computer comprises a bottom housing containing at least one heat-generating electronic component thermally connected with said at least one heat pipe, and a display panel hingedly connected to a rear edge of said housing, said first coupling element being formed in the bottom of said housing so as to be able to engage an upwardly oriented second coupling element on said docking station.

9. An arrangement as claimed in claim 3, wherein a fan in said docking station enhances the conveyance of heat dissipated by said mechanical heat sink to ambient air externally of said docking station.

10. An arrangement as claimed in claim 3, wherein said mechanical heat sink is flexibly mounted in said docking station to facilitate alignment between the coupling elements of said coupling device during docking of said computer in said docking station.

11. An arrangement as claimed in claim 7, wherein said docking station includes a horizontal shelf structure for supporting said computer housing bottom, said second coupling element being oriented so as to facilitate said coupling elements to automatically engage upon said computer being docked in said docking station.

12. An arrangement as claimed in claim 8, wherein a second heat pipe in said computer housing which is thermally connected to a further heat-generating electronic component extends to a thermal socket formed in the bottom of said computer housing and is adapted to matingly engage a thermal socket on said docking station communicating with said heat dissipating means.

13. A method of enhancing the cooling capacity of a portable personal computer through the transfer of heat therefrom to a docking station having said computer docked therein; comprising:
   (a) providing said portable personal computer with at least one heat pipe having a first end thermally connected to heat generating means in said computer and an opposite end terminating in a first coupling element of a coupling device;
   (b) providing a second coupling element of said coupling device mounted on said docking station; thermally connecting heat dissipating means in said docking station to said second coupling element, and engaging said second coupling element with said first coupling element for the transfer of heat therethrough from said at least one heat pipe to said heat dissipating means for dissipating the heat to ambient air; and
   (c) wherein said first coupling element being provided with a socket member including a bore fixedly receiving said opposite end of said at least one heat pipe; and a conical recess in said first coupling element adjacent said bore for receiving said second coupling element.

14. A method as claimed in claim 13, wherein said second coupling element comprises a plug having a frusto-conical portion engageable in said conical recess of said second coupling element upon said computer being docked in said docking station; a bore extending through said frusto-conical portion of said plug; and a second heat pipe having a first end fixed in said bore of the plug and having an opposite end thermally communicating with the heat dissipating means in said docking station.

15. A method as claimed in claim 13, wherein said heat dissipating means in said docking station comprises a mechanical heat sink.

16. A method as claimed in claim 13, wherein a fan in said docking station enhances the conveyance of heat dissipated by said mechanical heat sink to ambient air externally of said docking station.

17. A method as claimed in claim 13, wherein said heat dissipating means in said docking station is resiliently mounted so as to compensate for any misalignment between said first and second coupling elements during docking of said computer in said docking station.

18. A method as claimed in claim 14, wherein said conical recess in said first coupling element and said frusto-conical plug portion which is insertable therein are each formed to define an acutely angled taper to prevent locking together of the coupling elements while forming a large heat transfer area therebetween.

19. A method as claimed in claim 14, wherein said heat pipes comprise flexible means to provide compliance in aligning said coupling elements.

20. A method as claimed in claim 14, wherein said computer comprises a bottom housing containing a least one heat-generating electronic component thermally connected with said at least one heat pipe, and a display panel hingedly connected to a rear edge of said housing, said first coupling element extending through a rear wall of said housing in parallel with the bottom of said housing.

21. A method as claimed in claim 14, wherein said computer comprises a bottom housing containing at least one heat-generating electronic component thermally connected with said at least one heat pipe, and a display panel hingedly connected to a rear edge of said housing, said first coupling element being formed in the bottom of said housing so as to be able to engage an upwardly oriented second coupling element on said docking station.

22. A method as claimed in claim 15, wherein said mechanical heat sink is flexibly mounted in said docking station to facilitate alignment between the coupling elements of said coupling device during docking of said computer in said docking station.

23. A method as claimed in claim 22, wherein said docking station includes a horizontal shelf structure for supporting said computer housing bottom, said second coupling element being oriented so as to facilitate said coupling elements to automatically engage upon said computer being docked in said docking station.

24. A method as claimed in claim 21, wherein a second heat pipe in said computer housing is thermally connected to a further heat-generating electronic component and extends to a thermal socket formed in the bottom of said computer housing and is adapted to matingly engage a thermal socket on said docking station communicating with said heat dissipating means.

* * * * *